US008068289B2

(12) United States Patent
Eguchi (10) Patent No.: US 8,068,289 B2
(45) Date of Patent: Nov. 29, 2011

(54) OPTICAL SYSTEM AND OPTICAL APPARATUS HAVING THE SAME (75) Inventor: Kaoru Eguchi, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 39 days.

(21) Appl. No.: 12/543,393

(22) Filed: Aug. 18, 2009

(65) Prior Publication Data

US 2010/0053765 A1 Mar. 4, 2010

(30) Foreign Application Priority Data

Aug. 27, 2008 (JP) ................................. 2008-217842

(51) Int. Cl.
*G02B 13/04* (2006.01)
*G02B 15/14* (2006.01)
(52) U.S. Cl. .................... 359/753; 359/793; 359/682
(58) Field of Classification Search .................. 359/793, 359/649–651, 753, 781–784, 682, 761
See application file for complete search history.

(56) References Cited

U.S. PATENT DOCUMENTS

| 7,079,324 | B2 | 7/2006 | Yamasaki |
| 7,173,766 | B2 * | 2/2007 | Kimura et al. ............... 359/649 |
| 7,426,079 | B2 | 9/2008 | Yokoyama |

FOREIGN PATENT DOCUMENTS

| JP | 06-082689 A | 3/1994 |
| JP | 09-033801 A | 2/1997 |
| JP | 2001-188171 A | 7/2001 |

* cited by examiner

*Primary Examiner* — Scott J Sugarman
*Assistant Examiner* — Zachary Wilkes
(74) *Attorney, Agent, or Firm* — Canon U.S.A., Inc. I.P. Division (57) ABSTRACT An optical system includes, in order from an enlargement conjugate side to a reduction conjugate side, a first lens unit having a negative refractive power and a second lens unit having a positive refractive power. In the optical system, an aperture stop is located closer to the reduction conjugate side than the first lens unit, one or more positive lenses are located closer to the reduction conjugate side than the aperture stop, and the one or more positive lenses include a P-th positive lens located closest to the reduction conjugate side. Various optical qualities may be appropriately set to effectively control chromatic aberration for the entire image plane, provide high optical performance, and achieve a wide angle of view.

4 Claims, 6 Drawing Sheets

OPTICAL SYSTEM AND OPTICAL APPARATUS HAVING THE SAME

BACKGROUND OF THE INVENTION

1. Field of the Invention

The present invention relates to an optical system. More specifically, the present invention relates to an optical system useful in an optical apparatus, such as a silver-halide film camera, a digital still camera, a video camera, a digital video camera, a telescope, binoculars, a projector, or a copying machine.

2. Description of the Related Art

It is desired by the market that an optical system used in an optical apparatus, such as a digital camera, a video camera, or a projector, has a wide angle of view and is capable of forming a high-quality image (a projection image if a projector is used) without causing an aberration such as distortion.

As an optical system whose angle of view and back focal length can be easily enlarged or increased, a retrofocus type optical system is widely used. A retrofocus type optical system is widely used as a photographic optical system for an image pickup apparatus and a projection optical system for a projection apparatus (projector).

In a retrofocus type optical system, a lens unit having an overall negative refractive power is located on the front side of the optical system (on the object side in a photographic optical system and on the screen side in a projection optical system). On the rear side of the optical system (on the image side in a photographic optical system and on the original image side in a projection optical system), a lens unit having a positive refractive power is located.

Japanese Patent Application Laid-Open No. 09-033801, U.S. Pat. No. 7,426,079, and Japanese Patent Application Laid-Open No. 2001-188171 each discuss a retrofocus type photographic optical system including, in order from the object side to the image side, a first lens unit having a negative refractive power and a second lens unit having a positive refractive power.

Japanese Patent Application Laid-Open No. 06-082689 and U.S. Pat. No. 7,079,324 each discuss a retrofocus type projection optical system including, in order from the screen side to the original image side (the side of an image to be projected), a first lens unit having a negative refractive power and a second lens unit having a positive refractive power.

In a retrofocus type optical system, a lens unit having a negative refractive power is located ahead of other lens units. Accordingly, in a retrofocus type optical system, the arrangement of refractive powers is asymmetric with respect to the aperture stop. Therefore, negative distortion (barrel distortion) may easy occur.

In order to reduce negative distortion, it is useful to use a material having a high refractive index as a material of a negative lens included in the lens unit having a negative refractive power. However, a material having a high refractive index generally has a high dispersion. Accordingly, if a material having a high refractive index is used as a material of a negative lens included in a lens unit having a negative refractive power, a large amount of negative chromatic aberration of magnification (lateral chromatic aberration) may occur.

In order to correct chromatic aberration of magnification that may occur in a retrofocus type photographic optical system, it is useful to locate a positive lens made of a high-dispersion glass material within a first lens unit having a negative refractive power or a lens unit located in proximity to the first lens unit.

In addition, in order to correct negative chromatic aberration of magnification that may occur in a retrofocus type photographic optical system, it is useful to use a positive lens made of a low-dispersion material having an anomalous partial dispersion characteristic in a lens unit located closer to the rear side of the optical system than an aperture stop, whose height h of incidence of a paraxial chief ray (the distance from the optical axis) on a lens surface is relatively high.

However, with any of the above-described conventional methods, it is likely that some chromatic aberration of magnification may remain uncorrected because high-order chromatic aberration of magnification cannot be effectively corrected in this case. Accordingly, as the image height increases, chromatic aberration of magnification with respect to g-line light may increase in the positive direction. Therefore, the entire image is likely to be overcorrected.

In a conventional retrofocus type optical system, in order to balance chromatic aberration of magnification over the entire image plane, correction of aberration is executed so that chromatic aberration of magnification becomes negative at a medium image height and positive at a maximum image height.

Furthermore, a conventional retrofocus type optical system corrects aberration by using a high-dispersion plastic material having anomalous partial dispersion as a material of a lens of a lens unit, which is located closer to the rear side of the optical system than the aperture stop and whose height h of incidence of a paraxial chief ray on a surface of the lens (the distance from the optical axis) is relatively high.

However, if a plastic material is used as a lens material, one single lens cannot have a large power. Accordingly, the capacity of the lens to correct monochromatic aberration becomes small. In addition, if the refractive power of the lens is increased, when the refractive index of the material is low, various aberrations, such as distortion for a reference wavelength, may remain uncorrected.

SUMMARY OF THE INVENTION

According to an aspect of the present invention, an optical system includes, in order from an enlargement conjugate side to a reduction conjugate side, a first lens unit having a negative refractive power and a second lens unit having a positive refractive power. In the optical system, an aperture stop is located closer to the reduction conjugate side than the first lens unit, one or more positive lenses are located closer to the reduction conjugate side than the aperture stop, and the one or more positive lenses include a P-th positive lens located closest to the reduction conjugate side. A relative partial dispersion of a material of the P-th positive lens ($\theta_{gFP}$), an Abbe number of the material of the P-th positive lens ($\nu_{dp}$), a refractive index, with respect to d-line light, of the material of the P-th positive lens ($n_{dp}$), a distance from the aperture stop to a surface of the P-th positive lens on the reduction conjugate side ($d_{SP-P}$), a distance from the aperture stop to a surface on the reduction conjugate side of a lens located closest to the reduction conjugate side ($d_{SP-PR}$), a focal length of the P-th positive lens ($f_P$), and a focal length of the entire optical system ($f_S$) satisfy following conditions:

$$0.79 < \theta_{gFP} - (1.00 \times 10^{-4} \times \nu_{dp}^2 - 9.10 \times 10^{-3} \times \nu_{dp}) < 0.86$$

$$10 < \nu_{dp} < 30$$

$$1.7 < n_{dp} < 2.2$$

$$0.7 < d_{SP-P}/d_{SP-PR} \leq 1.0$$

$$0.5 < f_P/f_S < 2.2.$$

According to an exemplary embodiment of the present invention, chromatic aberration can be effectively corrected for the entire image plane. In addition, according to an exemplary embodiment of the present invention, an optical system having a high optical performance and a wide angle of view and an optical apparatus having the optical system can be implemented.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

DETAILED DESCRIPTION OF THE EMBODIMENTS

Various exemplary embodiments of the present invention will now be described in detail with reference to the drawings. It should be noted that the relative arrangement of the components, the numerical expressions, and numerical values set forth in these embodiments do not limit the scope of the present invention unless it is specifically stated otherwise.

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication of the lens elements and their materials.

In all of the examples illustrated and discussed herein any specific values, for example the zoom ratio and F-number, should be interpreted to be illustrative only and non limiting. Thus, other examples of the exemplary embodiments could have different values.

Notice that similar reference numerals and letters refer to similar items in the following figures, and thus once an item is defined in one figure, it may not be discussed for following figures.

Note that herein when referring to correcting or corrections of an error (e.g., aberration), a reduction of the error and/or a correction of the error is intended.

An optical system according to an exemplary embodiment of the present invention is a photographic optical system or a projection optical system. The optical system according to an exemplary embodiment of the present invention is a fixed focal length lens or a zoom lens. The optical system according to an exemplary embodiment of the present invention includes, in order from an enlargement conjugate side to a reduction conjugate side, a first lens unit having a negative refractive power and a second lens unit having a positive refractive power.

An aperture stop is located to the reduction conjugate side than the first lens unit. One or more positive lenses that can satisfy conditions (A1) through (A5) are located closer to the reduction conjugate side than the aperture stop. The conditions (A1) through (A5) will be described in detail below.

The "enlargement conjugate side" and the "reduction conjugate side" correspond to the object side and the image side, respectively, if the optical system is a photographic optical system. The "enlargement conjugate side" and the "reduction conjugate side" correspond to the screen side and the original image side, respectively, if the optical system is a projection optical system.

If the optical system according to an exemplary embodiment of the present invention is a fixed focal length lens, then the optical system includes, in order from the enlargement conjugate side to the reduction conjugate side, a first lens unit having a negative refractive power, a floating lens unit configured to move during focusing, and a second lens unit having a positive refractive power. In addition, an aperture stop is located closer to the reduction conjugate side than the first lens unit.

The back focal length is longer than the focal length. The "back focal length" refers to a distance from a surface on the reduction conjugate side of a lens located closest to the reduction conjugate side to the image plane.

If an optical member, such as a glass block, a prism, or a low-pass filter, is provided on the image side, a value calculated by converting the thickness of the optical member into an air-equivalent value is included in the back focal length as a part thereof.

One or more positive lenses that can satisfy conditions (1) through (5) are located closer to the reduction conjugate side than the aperture stop. The one or more positive lenses will be described in detail below.

If the optical system according to an exemplary embodiment of the present invention is a zoom lens, then the optical system includes, in order from the enlargement conjugate side to the reduction conjugate side, a first lens unit having a negative refractive power, a second lens unit having a positive refractive power, and a rear lens unit including a plurality of lens units. The distance between the first lens unit and the second lens unit varies during zooming. Furthermore, a part of or the entire first lens unit moves to execute focusing.

An aperture stop is located closer to the reduction conjugate side than the first lens unit. One or more positive lenses that can satisfy conditions (8) through (12) are located closer to the reduction conjugate side than the aperture stop.

Figure 1:
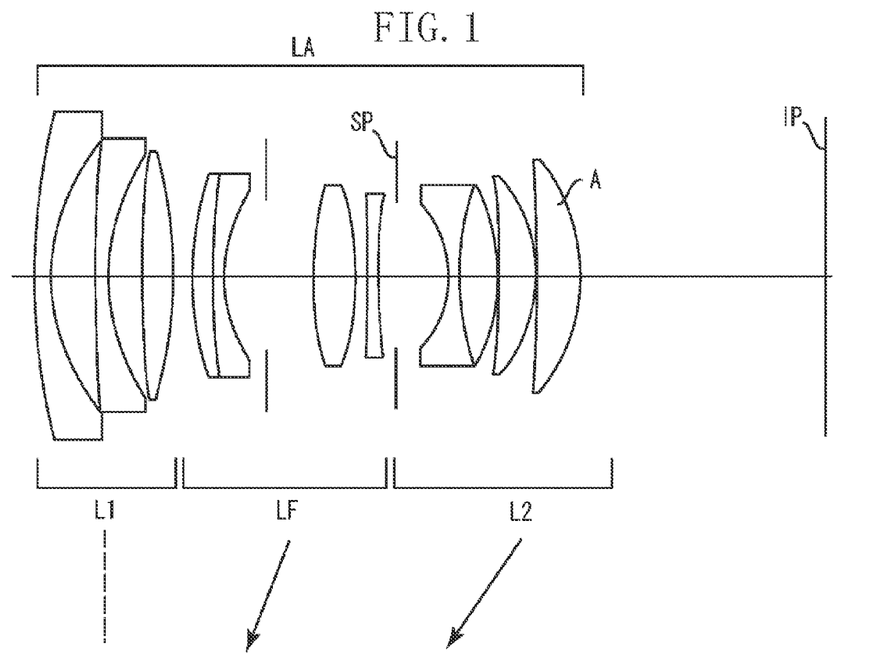
FIG. 1 is a lens cross section when focusing on an infinitely-distant object according to a first exemplary embodiment of the present invention.
Figure 2:
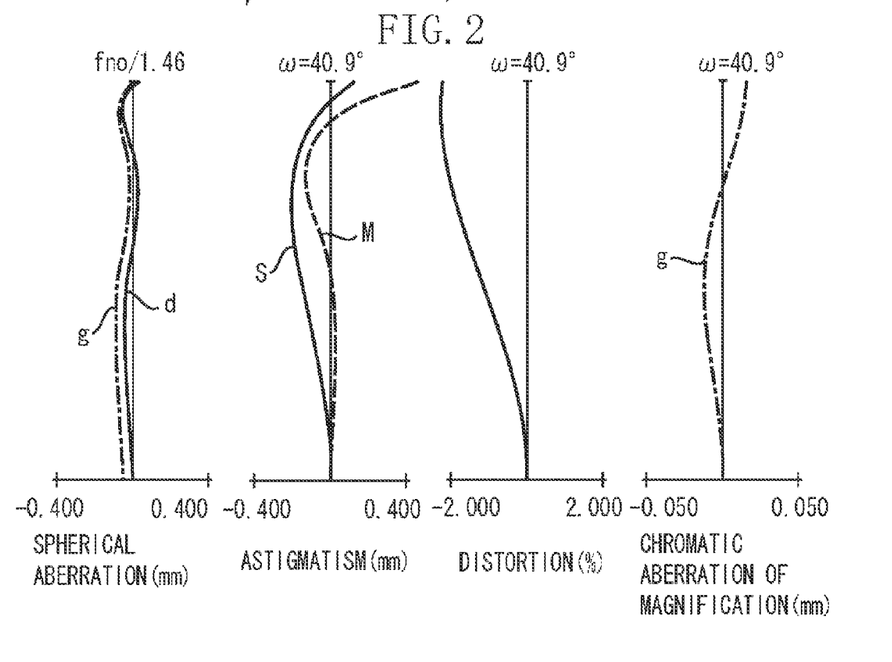
FIG. 2 is a longitudinal aberration chart at an object distance of 1.6 m according to the first exemplary embodiment of the present invention.

FIG. 1 is a lens cross section of an optical system according to a first exemplary embodiment of the present invention. FIG. 2 is a longitudinal aberration chart at an object distance of 1.6 m in the optical system according to the first exemplary embodiment. The "object distance" will hereafter refer to the distance from the object to an image plane IP when each numerical example is described in the unit of millimeter.

The first exemplary embodiment is a fixed focal length lens having a wide angle of view whose half angle of view (at the time of shooting or projection) is 40.9 degrees.

Figure 3:
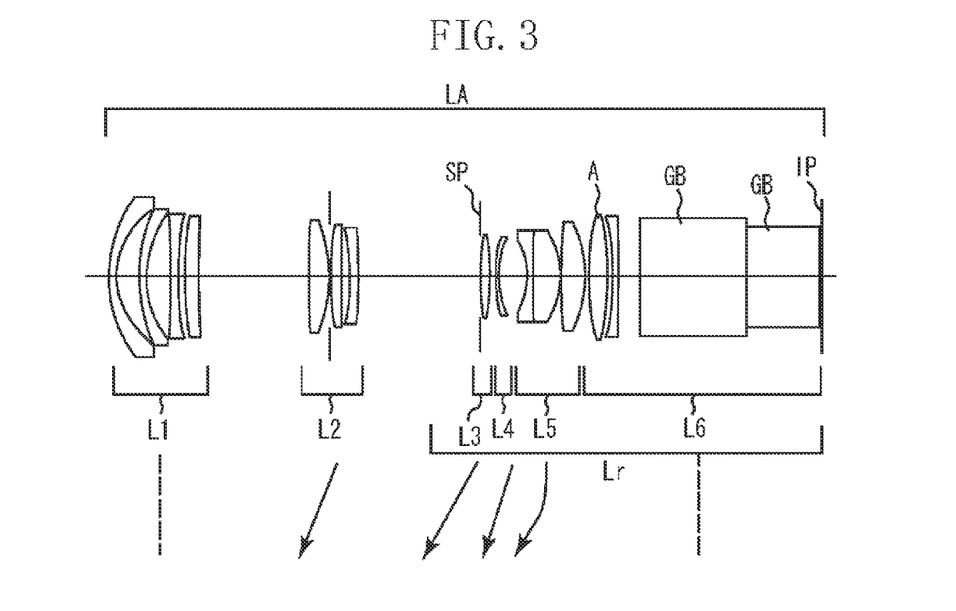
FIG. 3 is a lens cross section when focusing on an infinitely-distant object according to a second exemplary embodiment of the present invention.
Figure 4A:
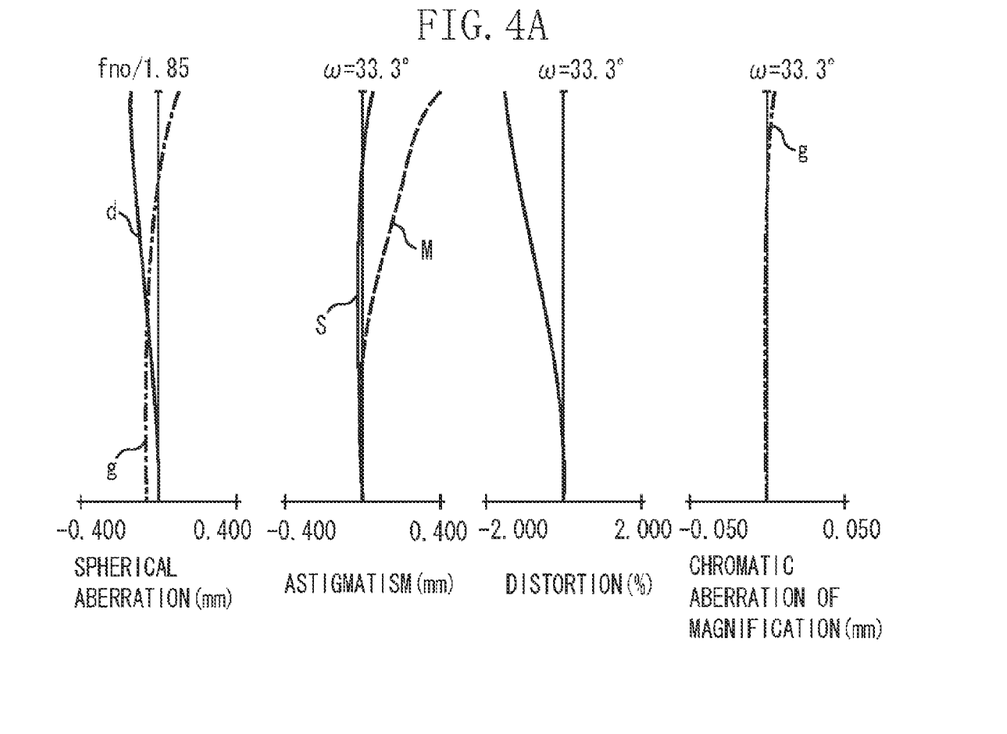
FIGS. 4A through 4C are longitudinal aberration charts at an object distance of 1.35 m according to the second exemplary embodiment of the present invention.
Figure 4B:
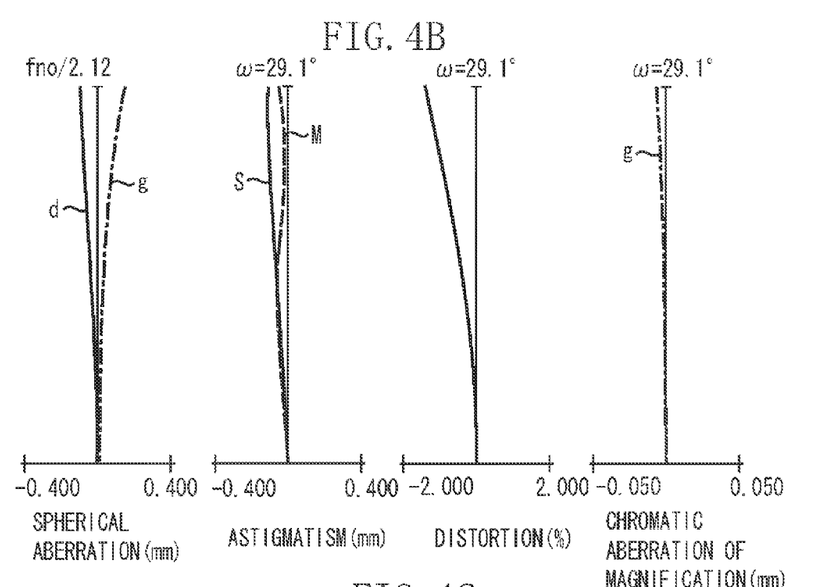
Figure 4C:
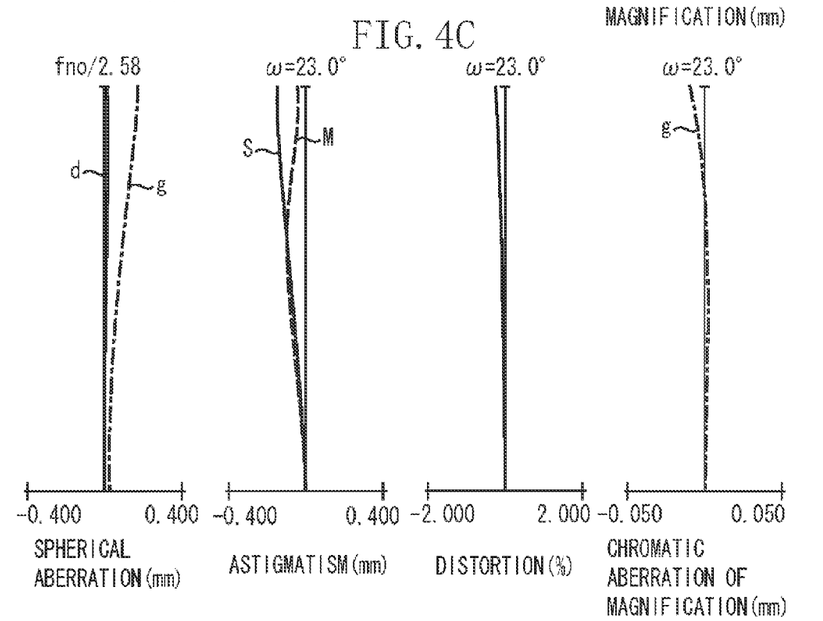

FIG. 3 is a lens cross section of an optical system at the wide-angle end according to a second exemplary embodiment of the present invention. FIG. 4A is a longitudinal aberration chart at the wide-angle end when the object distance of the optical system according to the second exemplary embodiment is 1.35 m. FIG. 4B is a longitudinal aberration chart at a middle focal length when the object distance of the optical system according to the second exemplary embodiment is 1.35 m. FIG. 4C is a longitudinal aberration chart at the telephoto end when the object distance of the optical system according to the second exemplary embodiment is 1.35 m.

The second exemplary embodiment is a zoom lens whose half angle of view at the wide-angle end is 33.3 degrees, whose half angle of view at the telephoto end is 23.0 degrees, and having a zoom ratio of 1.55.

Figure 5:
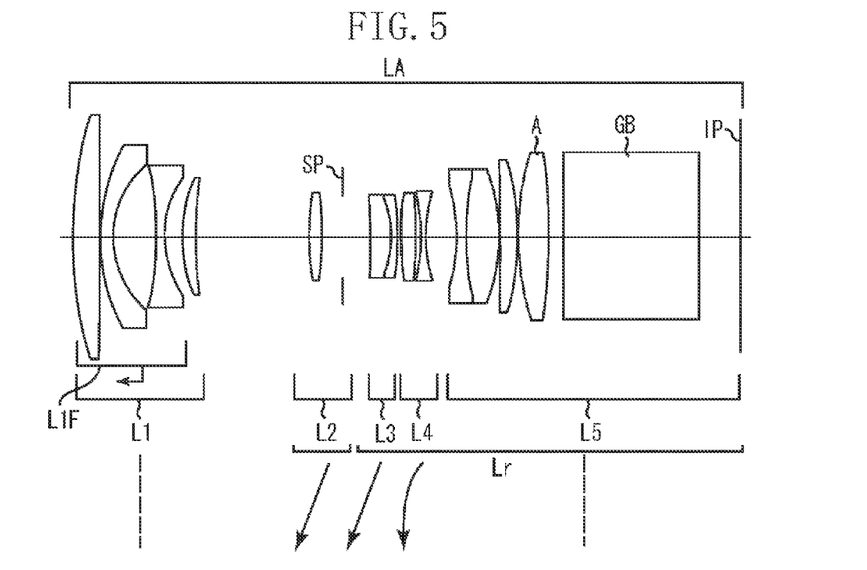
FIG. 5 is a lens cross section when focusing on an infinitely-distant object according to a third exemplary embodiment of the present invention.
Figure 6A:
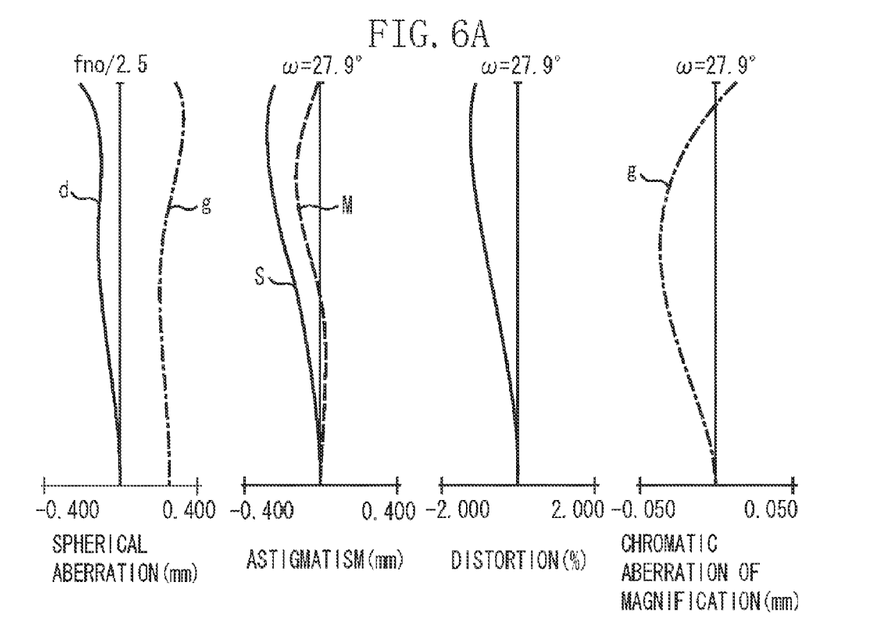
FIG. 6A through 6C are longitudinal aberration charts at an object distance of 2.5 m according to the third exemplary embodiment of the present invention.
Figure 6B:
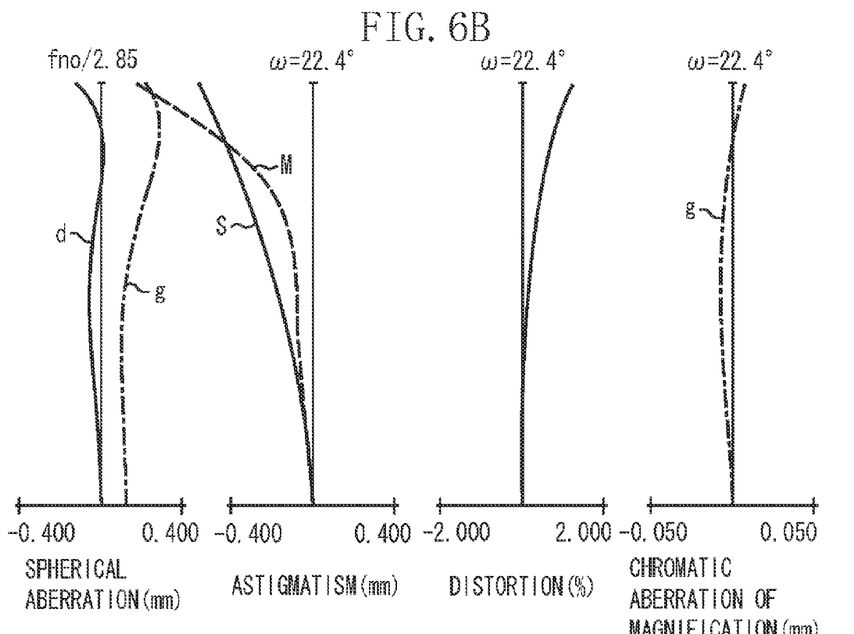
Figure 6C:
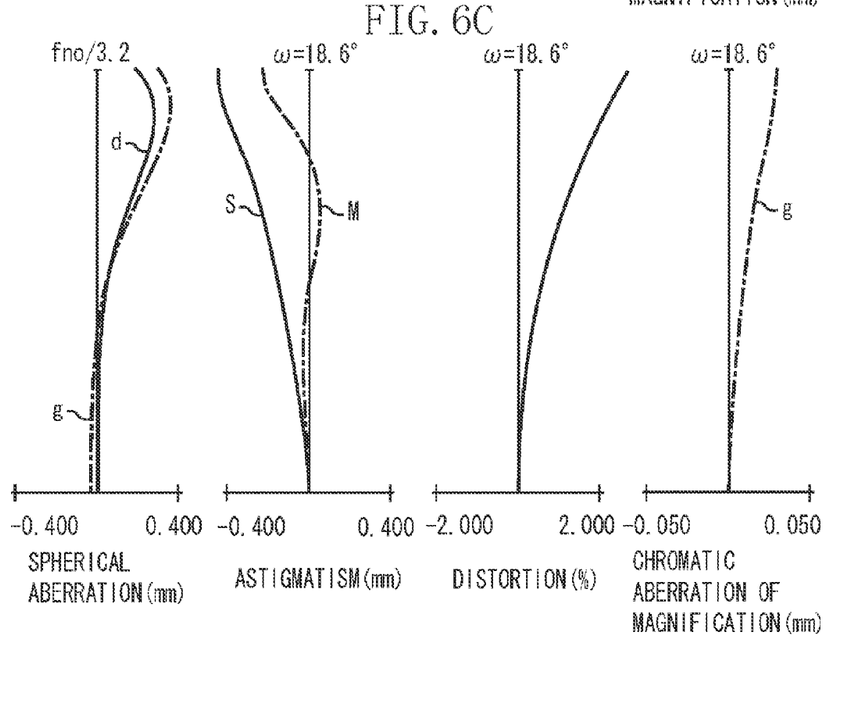

FIG. 5 is a lens cross section of an optical system at the wide-angle end according to a third exemplary embodiment of the present invention. FIG. 6A is a longitudinal aberration chart at the wide-angle end when the object distance of the optical system according to the third exemplary embodiment is 2.5 m. FIG. 6B is a longitudinal aberration chart at a middle focal length when the object distance of the optical system according to the third exemplary embodiment is 2.5 m. FIG. 6C is a longitudinal aberration chart at the telephoto end when the object distance of the optical system according to the third exemplary embodiment is 2.5 m.

The third exemplary embodiment is a zoom lens whose half angle of view at the wide-angle end is 27.9 degrees, whose half angle of view at the telephoto end is 18.6 degrees, and having a zoom ratio of 1.58.

Figure 7:
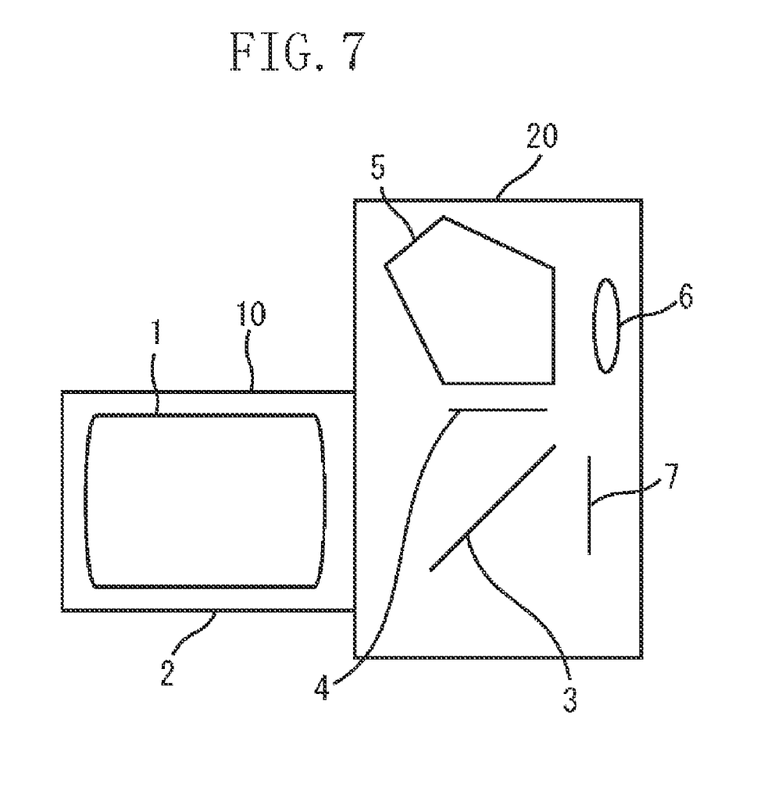
FIG. 7 illustrates exemplary main components of an image pickup apparatus according to an exemplary embodiment of the present invention.
Figure 8:
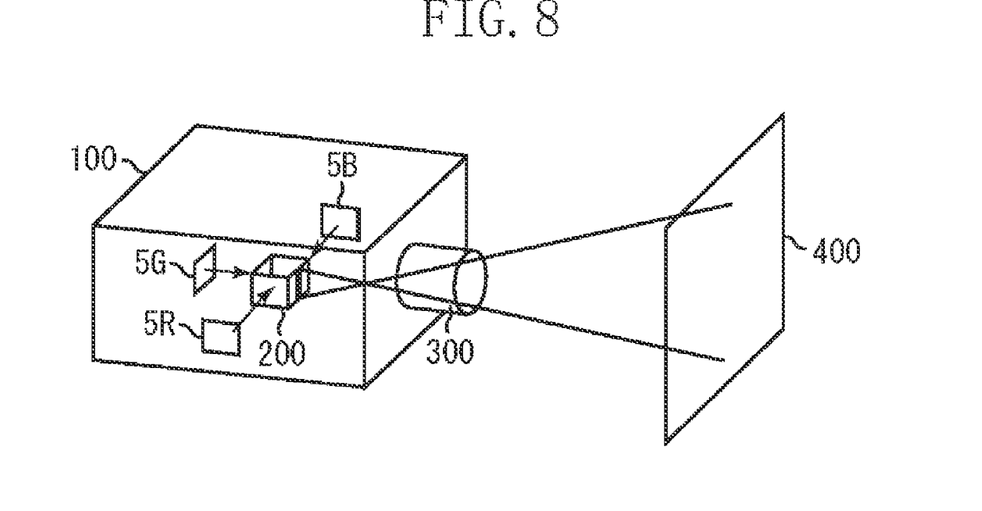
FIG. 8 illustrates exemplary main components of a projection apparatus according to an exemplary embodiment of the present invention.

FIG. 7 illustrates exemplary main components of an image pickup apparatus according to an exemplary embodiment of the present invention. FIG. 8 illustrates exemplary main components of a projection apparatus (projector) according to an exemplary embodiment of the present invention.

The optical system according to an exemplary embodiment is a photographic lens used in an image pickup apparatus, such as a video camera or a digital camera, or a projection lens used in an image projection apparatus (a projector). In each of the diagrams showing a cross section of a zoom lens (FIGS. 1, 3, and 5), the enlargement conjugate side (an object side or a front side) is indicated at the left-hand portion of the figure, and the reduction conjugate side (an image side or a rear side) is indicated at the right-hand portion thereof.

If the optical system according to an exemplary embodiment of the present invention is used as a projection lens for a projector, in each of the diagrams showing a cross section of a zoom lens (FIGS. 1, 3, and 5), the side of a screen is indicated at the left-hand portion of the figure, and the side of an image to be projected is indicated at the right-hand portion thereof.

In each of the diagrams showing a cross section of a zoom lens (FIGS. 1, 3, and 5), "LA" denotes an optical system. "i" denotes the order of a lens unit from the object side and "Li" denotes an i-th lens unit. In addition, in each of the diagrams showing a cross section of a zoom lens (FIGS. 1, 3, and 5), "Lr" denotes a rear lens unit (a subsequent lens unit) "SP" denotes an aperture stop.

"IP" denotes an image plane. The image plane IP is, when the optical system is used as a photographic optical system of a video camera or a digital still camera, equivalent to an imaging plane of a solid-state image sensor (photoelectric conversion element) such as a charge-coupled device (CCD) sensor or a complementary metal-oxide semiconductor (CMOS) sensor. The image plane IP is, when the optical system is used as a photographic optical system for a projector, equivalent to an original image (an image to be projected) to be displayed on a liquid crystal display (LCD) panel (LCD display device).

In the example illustrated in FIG. 1, "LF" denotes a floating lens unit having a positive refractive power. In the example illustrated in FIG. 5, "L1F" denotes a focusing lens unit. In the examples illustrated in FIGS. 3 and 5, "GB" denotes an optical block that is equivalent to a color separation or combination prism, an optical filter, a face plate (a parallel glass plate), a crystal low pass filter, or an infrared-light cut filter.

In each of the second and the third exemplary embodiments illustrated in FIGS. 3 and 5, each of the wide-angle end and the telephoto end refers to a zooming position when a second lens unit L2, which is a lens unit for varying magnification, is positioned at each of the ends of a range in which the magnification varying lens unit can mechanically move along an optical axis.

In each of the aberration charts (FIG. 2, FIGS. 4A through 4C, and FIGS. 6A through 6C), "d" and "g" respectively denote d-line light and g-line light. "M" and "S" respectively denote a meridional image plane and a sagittal image plane. Chromatic aberration of magnification is represented with g-line light. "fno" denotes an F-number, and "ω" denotes a half angle of view.

In the aberration chart of each exemplary embodiment, spherical aberration is illustrated in the range of ±0.4 mm, astigmatism in the range of ±0.4 mm, distortion in the range of ±2%, and chromatic aberration of magnification in the range of ±0.05 mm.

In the optical system according to each exemplary embodiment, a P-th positive lens is located closest to the reduction conjugate side among the one or more positive lenses which are located closer to the reduction conjugate side than the aperture stop SP.

Furthermore, a relative partial dispersion of a material of the P-th positive lens ($\theta_{gFP}$), an Abbe number of the material of the P-th positive lens ($v_{dp}$), a refractive index, with respect to d-line light, of the material of the P-th positive lens ($n_{dp}$), a distance from the aperture stop to a surface of the P-th positive lens on the reduction conjugate side ($d_{SP-P}$), a distance from the aperture stop to a surface on the reduction conjugate side of a lens located closest to the reduction conjugate side ($d_{SP-PR}$), a focal length of the P-th positive lens ($f_P$), and a focal length of the entire optical system ($f_S$) satisfy the following conditions, where the "distance . . . to a surface" denotes a distance to an intersection of the surface with the optical axis:

$$0.79 < \theta_{gFP} - (1.00 \times 10^{-4} \times v_{dp}^2 - 9.10 \times 10^{-3} \times v_{dp}) < 0.86 \quad \text{(A1)}$$

$$10 < v_{dp} < 30 \quad \text{(A2)}$$

$$1.7 < n_{dp} < 2.2 \quad \text{(A3)}$$

$$0.7 < d_{SP-P}/d_{SP-PR} \leq 1.0 \quad \text{(A4)}$$

$$0.5 < f_P/f_S < 2.2 \quad \text{(A5)}.$$

The Abbe number ($v_d$) and the relative partial dispersion ($\theta_{gF}$) can be defined with a refractive index of a material with respect to g-line light (with a wavelength of 435.8 nm) ($N_g$), a refractive index of the material with respect to d-line light (with a wavelength of 587.6 nm) ($N_d$), a refractive index of the material with respect to F-line light (with a wavelength of 486.1 nm) ($N_F$), and a refractive index of the material with respect to C-line light (with a wavelength of 656.3 nm) ($N_C$), as follows:

$$v_d=(N_d-1)/(N_F-N_C)$$

$$\theta_{gF}=(N_g-N_F)/(N_F-N_C).$$

If the optical system according to each exemplary embodiment is a zoom lens, the focal length ($f_S$) can be defined as follows:

$$f_S=\sqrt{f_w \cdot f_T}$$

where "$f_w$" denotes a focal length of the entire optical system at the wide-angle end and "$f_T$" denotes a focal length of the entire optical system at the telephoto end.

In each exemplary embodiment of the present invention, it is more useful if an Abbe number, with respect to d-line light, of a material of at least one negative lens among negative lenses located closer to the reduction conjugate side than the aperture stop ($v_{NN}$), a focal length of the at least one negative lens with respect to the d-line light ($f_{NN}$), and a maximum value of values of the Abbe numbers, with respect to d-line light, of materials of positive lenses other than the P-th positive lens, among the one or more positive lenses located closer to the reduction conjugate side than the aperture stop SP ($v_{PPmax}$) can satisfy at least one of the following conditions:

$$0<|(v_{NN} \times f_{NN})/f_S|<30 \tag{A6}$$

$$65<v_{PPmax}<98 \tag{A7}.$$

If the optical system according to each exemplary embodiment of the present invention is a fixed focal length lens, an A-th positive lens is located closest to the reduction conjugate side among the one or more positive lenses located closer to the reduction conjugate side than the aperture stop SP.

In this case, a relative partial dispersion of a material of the A-th positive lens ($\theta_{gFs}$), an Abbe number of the material of the A-th positive lens ($v_{ds}$) a refractive index, with respect to d-line light, of the material of the A-th positive lens ($n_{ds}$), a distance from the aperture stop to a surface of the A-th positive lens on the reduction conjugate side ($d_{SP-Ri}$), a distance from the aperture stop to a surface on the reduction conjugate side of a lens located closest to the reduction conjugate side ($d_{SP-Rk}$), a focal length of the A-th positive lens ($f_G$), and a focal length of the entire optical system (f) satisfy the following conditions:

$$0.79<\theta_{gFs}-(1.00\times 10^{-4}\times v_{ds}^2-9.10\times 10^{-3}\times v_{ds})<0.86 \tag{1}$$

$$10<v_{ds}<30 \tag{2}$$

$$1.7<n_{ds}<2.2 \tag{3}$$

$$0.7<d_{SP-Ri}/d_{SP-Rk}\leq 1.0 \tag{4}$$

$$0.5<f_G/f<2.2 \tag{5}.$$

Moreover, if the optical system according to each exemplary embodiment of the present invention is a fixed focal length lens, it is more useful if an Abbe number, with respect to d-line light, of a material of at least one negative lens, among negative lenses located closer to the reduction conjugate side than the aperture stop ($v_N$), a focal length, with respect to d-line light, of the at least one negative lens ($F_N$), and a maximum value of values of the Abbe numbers, with respect to d-line light, of materials of positive lenses other than the A-th positive lens, among one or more positive lenses located closer to the reduction conjugate side than the aperture stop ($v_{Pmax}$) can satisfy at least one of the following conditions:

$$0<|(v_N \times f_N)/f|<30 \tag{6}$$

$$65<v_{Pmax}<98 \tag{7}.$$

Moreover, if the optical system according to each exemplary embodiment of the present invention is a zoom lens, a Z-th positive lens is located closest to the reduction conjugate side among one or more positive lenses located closer to the reduction conjugate side than the aperture stop SP.

In this case, a relative partial dispersion of a material of the Z-th positive lens ($\theta_{gFz}$), an Abbe number of the material of the Z-th positive lens ($v_{dz}$), a refractive index, with respect to d-line light, of the material of the Z-th positive lens ($n_{dZ}$), a distance from the aperture stop SP to a surface of the Z-th positive lens on the reduction conjugate side at the wide-angle end ($d_{SP-Riz}$), a distance from the aperture stop SP to a surface on the reduction conjugate side of a lens located closest to the reduction conjugate side at the wide-angle end ($d_{SP-Rkz}$), a focal length of the Z-th positive lens ($f_{Gz}$), a focal length of the entire optical system at the wide-angle end ($f_w$), and a focal length of the entire optical system at the telephoto end ($f_T$) satisfy the following conditions:

$$0.79<\theta_{gFz}-(1.00\times 10^{-4}\times v_{dz}^2-9.10\times 10^{-3}\times v_{dZ})<0.86 \tag{8}$$

$$10<v_{dz}<30 \tag{9}$$

$$1.7<n_{dz}<2.2 \tag{10}$$

$$0.7<d_{SP-Riz}/d_{SP-Rkz}\leq 1.0 \tag{11}$$

$$0.5<f_{GZ}/\sqrt{f_w \cdot f_T}<2.2 \tag{12}.$$

If the optical system according to each exemplary embodiment of the present invention is a zoom lens, it is useful if an Abbe number, with respect to d-line light, of a material of at least one negative lens among negative lenses located closer to the reduction conjugate side than the aperture stop SP ($v_{NZ}$), a focal length of the at least one negative lens in the air ($f_{Nz}$), and a maximum value of values of the Abbe numbers, with respect to d-line light, of materials of positive lenses other than the Z-th positive lens, among the one or more positive lenses located closer to the reduction conjugate side than the aperture stop SP ($v_{Pmaxz}$) can satisfy at least one of the following conditions:

$$0<|(v_{NZ} \times f_{NZ})/\sqrt{f_w \cdot f_T}|<30 \tag{13}$$

$$65<v_{Pmaxz}<98 \tag{14}.$$

The above-described conditions (A1) through (A7) can be applied if the optical system according to an exemplary embodiment is a fixed focal length lens or a zoom lens. The above-described conditions (1) through (7) can be applied if the optical system according to an exemplary embodiment is a fixed focal length lens. The above-described conditions (8) through (14) can be applied if the optical system according to an exemplary embodiment is a zoom lens.

In addition, the conditions (A1) through (A7) provide a technical condition corresponding to the conditions (1) through (7) (if the optical system according to each exemplary embodiment is a fixed focal length lens) and to the conditions (8) through (14) (if the optical system according to each exemplary embodiment is a zoom lens), respectively.

The retrofocus type optical system according to each exemplary embodiment has a lens structure asymmetric with respect to the position of the aperture stop (aperture stop plane) SP. Moreover, the retrofocus type optical system according to each exemplary embodiment has a wide angle of view. Accordingly, both low-order distortion and high-order distortion may easily occur. The same applies to the wavelength other than the reference wavelength. In addition, both low-order chromatic aberration of magnification and high-order chromatic aberration of magnification (chromatic distortion) may easily occur.

"Low-order distortion (chromatic aberration of magnification)" is expressed by a third order aberration coefficient in the paraxial theory. "High-order distortion (chromatic aberration of magnification)" is expressed by a fifth or higher order aberration coefficient in the paraxial theory.

If a large amount of low-order aberration occurs, then the slope of the variation of the amount of aberration that may occur due to variation of the image height may become large. On the other hand, if a large amount of high-order aberration occurs, then an inflection point may arise on an aberration curve due to the variation of the image height. Accordingly, in this case, the aberration curve may be warped.

In order to effectively correct various aberrations that may occur in this case, it is useful to increase the number of lenses of each lens unit and raise the degree of freedom of designing the optical system. However, if the number of lenses is increased, the size of the entire lens system may increase. Therefore, the weight of the optical system may increase.

The optical system of each exemplary embodiment includes a positive lens A (the P-th positive lens, the A-th positive lens, or the Z-th positive lens), which can satisfy the conditions (A1) through (A5), the conditions (1) through (5), or the conditions (8) through (12) at a position closer to the image side than the aperture stop SP, at which the height of incidence of an off-axis ray is high.

With the above-described configuration, each exemplary embodiment of the present invention can reduce the difference among various aberrations that may occur within the first lens unit L1 (in particular, the difference between the amount of chromatic aberration of magnification with respect to g-line light and the amount of chromatic aberration of magnification with respect to F-line light). According to each exemplary embodiment of the present invention having the above-described lens configuration, the amount of high-order chromatic aberration of magnification in the optical system can be effectively reduced for the entire image plane.

A technical significance of each of the above-described conditions will be described in detail below. In the present invention, the conditions (A1) through (A7) provide a technical condition corresponding to the conditions (1) through (7) (if the optical system according to each exemplary embodiment is a fixed focal length lens) and to the conditions (8) through (14) (if the optical system according to each exemplary embodiment is a zoom lens), respectively.

Each mutually-corresponding conditions provide a condition that can be applied to a fixed focal length lens or a zoom lens or either one of the same. Hereinbelow, mutually-corresponding conditions will be described in detail at the same time.

The conditions (A1), (1), and (8) each provide a condition for calculating a relative partial dispersion of the positive lens A, which is located closer to the image side than the aperture stop SP, in the above-described retrofocus type optical system.

If the upper limit of the conditions (A1), (1), and (8) is exceeded, then the relative partial dispersion may increase. Accordingly, the effect of reducing the difference between chromatic aberration of magnification with respect to g-line light and chromatic aberration of magnification with respect to F-line light may become high but the difference between chromatic aberration of magnification with respect to g-line light and chromatic aberration of magnification with respect to C-line light may increase to a level too high to easily correct the same.

Then, it becomes necessary to increase the number of lenses. Accordingly, the size of the entire lens system may increase and the total weight of the lens system may increase.

On the other hand, if the lower limit of the conditions (A1), (1), and (8) is exceeded, then the relative partial dispersion becomes low. Accordingly, the effect of correcting high-order chromatic aberration of magnification may decrease. Accordingly, in this case, it becomes necessary to increase the number of lenses in order to correct the uncorrected high-order chromatic aberration of magnification. Accordingly, the size of the entire lens system may increase and the total weight of the lens system may increase.

The ranges of the values in the conditions (A1), (1), and (8) can be altered as follows:

$$0.793 < \theta_{gFP} - (100 \times 10^{-4} \times v_{dp}^2 - 9.10 \times 10^{-3} \times v_{dP}) < 0.85 \quad (A1a)$$

$$0.793 < \theta_{gFs} - (100 \times 10^{-4} \times v_{ds}^2 - 9.10 \times 10^{-3} \times v_{ds}) < 0.85 \quad (1a)$$

$$0.793 < \theta_{gFz} - (100 \times 10^{-4} \times v_{dz}^2 - 9.10 \times 10^{-3} v_{dz}) < 0.85 \quad (8a).$$

The ranges of the values in the conditions (A1), (1), and (8) can be further altered as follows:

$$0.796 < \theta_{gFP} - (1.00 \times 10^{-4} \times v_{dp}^2 - 9.10 \times 10^{-3} \times v_{dP}) < 0.84 \quad (A1b)$$

$$0.796 < \theta_{gFs} - (1.00 \times 10^{-4} \times v_{ds}^2 - 9.10 \times 10^{-3} \times v_{ds}) < 0.84 \quad (1b)$$

$$0.796 < \theta_{gFz} - (1.00 \times 10^{-4} \times v_{dz}^2 - 9.10 \times 10^{-3} \times v_{dz}) < 0.84 \quad (8b).$$

The conditions (A2), (2), and (9) each provide a condition for a value of the Abbe number of the material of the positive lens A, which is located closer to the image side than the aperture stop SP. If the upper limit of the conditions (A2), (2), and (9) is exceeded, then the material of the positive lens A has low dispersion. Accordingly, the effect of reducing the difference between chromatic aberration of magnification with respect to g-line light and chromatic aberration of magnification with respect to F-line light may decrease because the dispersion becomes low.

Accordingly, in this case, in order to achieve the above-described effect, it becomes necessary to increase the positive lens A with a great power. Therefore, it becomes difficult to correct other aberrations.

If the lower limit of the conditions (A2), (2), and (9) is exceeded, then the material of the positive lens A has high dispersion. Accordingly, the effect of reducing the difference between chromatic aberration of magnification with respect to g-line light and chromatic aberration of magnification with respect to F-line light may increase but the difference between chromatic aberration of magnification with respect to g-line light and chromatic aberration of magnification with respect to C-line light may increase to a level too high to easily correct the same.

Then, it becomes necessary to increase the number of lenses. Accordingly, the size of the entire lens system may increase and the total weight of the lens system may increase.

Furthermore, the ranges of the values in the conditions (A2), (2), and (9) can be altered as follows:

$$15 < v_{dp} < 29 \quad (A2a)$$

$$15 < v_{ds} < 29 \quad (2a)$$

$$15 < v_{dz} < 29 \quad (9a).$$

The conditions (A3), (3), and (10) each provide a condition for a value of a refractive index of the material of the positive lens A, which is located closer to the image side than the aperture stop SP. A material whose value of refractive index exceeds the upper limit of the conditions (A3), (3), and (10) may hardly be used as an optical member. On the other hand, if the lower limit of the conditions (A3), (3), and (10) is exceeded, then the effect of correcting aberration at the reference wavelength (the effect of correcting distortion, in particular) may decrease. Accordingly, it becomes difficult to balancedly and effectively correct various aberrations.

The ranges of the values in the conditions (A3), (3), and (10) can be altered as follows:

$$1.71 < n_{dP} < 2.0 \quad (A3a)$$

$$1.71 < n_{dS} < 2.0 \quad (3a)$$

$$1.71 < n_{dZ} < 2.0 \quad (10a).$$

The conditions (A4), (4), and (11) each provide a condition for the position of the positive lens A located closer to the image side than the aperture stop SP.

The upper limit value of the conditions (A4), (4), and (11) is equivalent to a case where the lens is located closest to the image plane within the optical system. Accordingly, the positive lens A cannot be located at a position exceeding the upper limit values of the conditions (A4), (4), and (11).

On the other hand, if the lower limit of the conditions (A4), (4), and (11) is exceeded, then the positive lens A, which is located closer to the image side than the aperture stop SP, is to be located at a position at which the height of an incident ray is low (at a position closer to the aperture stop SP).

Accordingly, in this case, in order to effectively correct chromatic aberration of magnification, it becomes necessary to increase the power of the positive lens A to a great power. As a result, it becomes difficult to correct other various aberrations.

The ranges of the values in the conditions (A4), (4), and (11) can be altered as follows:

$$0.8 < d_{SP-P}/d_{SP-PR} \leq 1.0 \quad (A4a)$$

$$0.8 < d_{SP-R}/d_{SP-Rk} \leq 1.0 \quad (4a)$$

$$0.8 < d_{SP-Ri}/d_{SP-Rkz} \leq 1.0 \quad (11a).$$

The conditions (A5), (5), and (12) each provide a condition for a refractive index of the positive lens A, which is located closer to the image side than the aperture stop SP.

If the upper limit of the conditions (A5), (5), and (12) is exceeded, then the refractive power of the positive lens A, which is located closer to the image side than the aperture stop SP, may decrease. Accordingly, the effect of reducing the difference between chromatic aberration of magnification with respect to g-line light and chromatic aberration of magnification with respect to F-line light may decrease.

Therefore, in order to effectively correct the uncorrected high-order chromatic aberration of magnification, it becomes necessary to increase the number of lenses. Accordingly, the size of the entire lens system may increase and the total weight of the lens system may increase.

If the lower limit of the conditions (A5), (5), and (12) is exceeded, then the power of the positive lens A, which is located closer to the image side than the aperture stop SP, may become too high to effectively correct the difference between chromatic aberration of magnification with respect to g-line light and chromatic aberration of magnification with respect to C-line light.

The optical performance of the optical system can be further increased if the ranges of the values in the conditions (A5), (5), and (12) are altered as follows:

$$0.8 < f_P/f_S < 2.1 \quad (A5a)$$

$$0.8 < f_G/f < 2.1 \quad (5a)$$

$$0.8 < f_{GZ}/\sqrt{f_w \cdot f_T} < 2.1 \quad (12a).$$

With the above-described configuration, each exemplary embodiment of the present invention can effectively correct chromatic aberration for the entire image plane in a retrofocus type image forming optical system. Accordingly, a high-quality image can be easily achieved.

The conditions (A6), (6), and (13) and the conditions (A7), (7), and (14) each provide a condition that can be satisfied to further increase the optical performance of each exemplary embodiment. More specifically, the conditions (A6), (6), and (13) each provide a condition for the effect of correcting chromatic aberration that may occur in a negative lens, which is located closer to the image side than the aperture stop SP.

If the upper limit of the conditions (A6), (6), and (13) is exceeded, the effect of correcting the chromatic aberration that may occur in a negative lens located closer to the image side than the aperture stop SP may decrease. Accordingly, in order to effectively correct the uncorrected chromatic aberration (chromatic aberration of magnification, in particular), it becomes necessary to increase the number of lenses. Therefore, the size of the entire lens system may increase and the total weight of the lens system may increase.

On the other hand, if the lower limit of the conditions (A6), (6), and (13) is exceeded, then the power of the negative lens located closer to the image side than the aperture stop SP may become zero. Accordingly, in this case, it becomes difficult to balancedly and effectively correct aberrations.

The ranges of the values in the conditions (A6), (6), and (13) can be altered as follows:

$$5 < |(v_{NN} \times f_{NN})/f_S| < 28 \quad (A6a)$$

$$5 < |(v_N \times f_N)/f| < 28 \quad (6a)$$

$$5 < |(v_{NZ} \times f_{NZ})/\sqrt{f_w \cdot f_T}| < 28 \quad (13a).$$

The conditions (A7), (7), and (14) each provide a condition for a maximum value of an Abbe number of the positive lens located closer to the image side than the aperture stop SP.

If the upper limit of the conditions (A7), (7), and (14) is exceeded, then the dispersion of the positive lens, which is located closer to the image side than the aperture stop SP, becomes so low that chromatic aberration of magnification may be overcorrected.

On the other hand, if the lower limit of the conditions (A7), (7), and (14) is exceeded, then the dispersion of the positive lens, which is located closer to the image side than the aperture stop SP, becomes very high. Accordingly, in this case, in order to balancedly and effectively correct chromatic aberration of magnification, it becomes necessary to increase the number of lenses. Therefore, the size of the entire lens system may increase and the total weight of the lens system may increase.

The optical performance of the optical system can be further increased if the ranges of the values in the conditions (A7), (7), and (14) are altered as follows:

$$70 < v_{PPmax} < 96 \quad (A7a)$$

$$70 < v_{Pmax} < 96 \quad (7a)$$

$$70 < v_{Pmaxz} < 96 \quad (14a).$$

Now, the lens configuration of the optical system according to each exemplary embodiment will be described in detail below.

The optical system LA according to the first exemplary embodiment (FIG. 1) includes, in order from the enlargement conjugate side to the reduction conjugate side, a first lens unit L1 having a negative refractive power, a floating lens unit LF having a positive refractive power, an aperture stop SP, and a second lens unit L2 having a positive refractive power.

The optical system according to the first exemplary embodiment is a fixed focal length photographic lens (shooting lens). During focusing, the first lens unit L1 is stationary.

The floating lens unit LF moves towards the object side during focusing from an infinitely-distant object to a short-distance object as a floating optical member. In addition, the second lens unit L2 moves towards the object side during focusing from an infinitely-distant object to a short-distance object.

More specifically, during focusing from an infinitely-distant object to a short-distance object, the floating lens unit LF and the second lens unit L2 move towards the enlargement conjugate side in such a way as to decrease the distance between them. During focusing, the aperture stop SP moves integrally with the second lens unit L2.

Furthermore, the positive lens A (the A-th positive lens ($n_d$=1.73000, $v_d$=26.0, and $\theta_{gF}$=0.635)), which is located closest to the image plane IP within the second lens unit L2, can satisfy the conditions (A1) through (A5) and the conditions (1) through (5).

In the first exemplary embodiment of the present invention, it is also useful if one or more lens units, which is stationary or moves during focusing, is provided on the image side (on the reduction conjugate side) of the second lens unit L2.

The optical system LA according to the second exemplary embodiment (FIG. 3) is a zoom lens including, in order from the enlargement conjugate side to the reduction conjugate side, a first lens unit L1 having a negative refractive power, a second lens unit L2 having a positive refractive power, a third lens unit L3 having a positive refractive power, a fourth lens unit L4 having a negative refractive power, a fifth lens unit L5 having a positive refractive power, and a sixth lens unit L6 having a positive refractive power. The zoom ratio of the zoom lens according to the second exemplary embodiment is 1.55.

During focusing from an infinitely-distant object to a short-distance object, the first lens unit L1 moves towards the enlargement conjugate side. During zooming from the wide-angle end to the telephoto end, the first lens unit L1 and the sixth lens unit L6 are stationary.

During zooming from the wide-angle end to the telephoto end, the second lens unit L2 through the fifth lens unit L5 move separately and independently from one another towards the enlargement conjugate side as illustrated with each corresponding arrow in FIG. 3.

The fifth lens unit L5 is a lens unit for effecting variation of magnification or correcting variation of the image plane that may occur during variation of magnification. The third lens unit L3 includes an aperture stop SP, which moves integrally with the third lens unit L3 during zooming. The positive lens Z (the Z-th positive lens ($n_d$=1.77071, $v_d$=23.0, and $\theta_{gF}$=0.645)), which is located closer to the image side than the aperture stop SP and closest to the image plane IP, can satisfy the conditions (8) through (12).

A glass block GB, which is a color combining prism, a polarizing filter, or a color filter, is not considered or handled as the lens related to the condition (11).

The optical system according to the third exemplary embodiment (FIG. 5) is a zoom lens including, in order from the enlargement conjugate side to the reduction conjugate side, a first lens unit L1 having a negative refractive power, a second lens unit L2 having a positive refractive power, a third lens unit L3 having a positive refractive power, a fourth lens unit L4 having a negative refractive power, and a fifth lens unit L5 having a positive refractive power. The zoom ratio of the zoom lens according to the third exemplary embodiment is 1.58.

During focusing from an infinitely-distant object to a short-distance object, a focusing lens unit L1F, which is a part of the first lens unit L1, moves towards the enlargement conjugate side. During zooming from the wide-angle end to the telephoto end, the first lens unit L1 and the fifth lens unit L5 are stationary.

During zooming from the wide-angle end to the telephoto end, the second lens unit L2 through the fourth lens unit L4 move separately and independently from one another towards the enlargement conjugate side as illustrated with each corresponding arrow in FIG. 5.

The fourth lens unit L4 is a lens unit for effecting variation of magnification or correcting variation of the image plane that may occur during variation of magnification. The second lens unit L2 includes an aperture stop SP configured to move integrally with the second lens unit L2.

The positive lens Z (the Z-th positive lens ($n_d$=1.77071, $v_d$=23.0, and $\theta_{gF}$=0.668)), which is located closer to the image side than the aperture stop SP and closest to the image plane IP, can satisfy the conditions (8) through (12).

A glass block GB, which is a color combining prism, a polarizing filter, or a color filter, is not considered or handled as the lens related to the condition (11).

In each exemplary embodiment of the present invention, it is also useful if a lens unit such as a converter lens or a focal lens system is provided on at least one of the object side and the image side of the first lens unit L1.

With the above-described configuration, each exemplary embodiment of the present invention can implement an image forming optical system capable of effectively correcting chromatic aberration for the entire image plane and having a high optical performance.

Numerical examples 1 through 3 that respectively correspond to the first through the third exemplary embodiments are set forth below. In each of the numerical examples 1 through 3, "i" denotes the order of a surface from the object side, "ri" denotes a radius of curvature of the i-th optical surface (an i-th surface), "di" denotes an axial interval between the i-th surface and the (i+1)th surface, "ndi" and "vdi" respectively denote a refractive index and an Abbe number of the i-th optical material with respect to d-line light. In addition, "f" denotes a focal length of the entire optical system when focusing on an infinitely-distant object. "Fno" denotes an F-number of the entire optical system when focusing on an infinitely-distant object. "2ω" denotes an angle of view (in the unit of degrees) of the entire optical system when focusing on an infinitely-distant object.

In addition, "K" denotes a conic coefficient, and each of "A4", "A6", "A8", and "A10" denotes an aspheric coefficient. The aspheric shape is expressed as $$X=(H^2/R)/[1+\{1-(1+K)(H/R)^2\}^{1/2}]+A4H^4+A6H^6+A8H^8+A10H^{10}$$

where "X" denotes a displacement from a surface vertex along the optical axis in a position at a height "H" from the optical axis, and "R" denotes a paraxial radius of curvature. Furthermore, "e-Z" denotes "×10$^{-Z}$". In addition, the relationship between each condition described above and each numerical example is set forth in Table 1.

NUMERICAL EXAMPLE 1 f = 25.00 Fno = 1.46 2ω = 81.8°

Surface data

| Surface No. | r | d | nd | vd | Effective diameter |
|---|---|---|---|---|---|
| 1 | 106.476 | 2.80 | 1.69680 | 55.5 | 52.62 |
| 2 | 34.237 | 7.20 | | | 43.99 |
| 3 | 231.200 | 2.30 | 1.69680 | 55.5 | 43.78 |
| 4 | 36.544 | 5.48 | | | 39.80 |
| 5 | 152.788 | 5.38 | 1.79952 | 42.2 | 39.73 |
| 6 | −73.268 | 2.87 | | | 39.50 |
| 7 | 52.697 | 3.50 | 1.84666 | 23.8 | 32.57 |
| 8 | 125.863 | 1.70 | 1.43875 | 95.0 | 31.14 |
| 9 | 25.660 | 7.10 | | | 26.95 |
| 10 | ∞ | 7.48 | | | 24.90 |
| 11 | 55.654 | 7.30 | 1.80400 | 46.6 | 28.32 |
| 12 | −44.368 | 2.00 | | | 28.20 |
| 13 | −160.594 | 1.48 | 1.75520 | 27.5 | 25.63 |
| 14 | 83.004 | 3.13 | | | 24.75 |
| stop 15 | ∞ | 8.68 | | | 24.10 |
| 16 | −17.472 | 1.50 | 1.84666 | 23.8 | 22.79 |
| 17 | 42.214 | 6.75 | 1.60300 | 65.4 | 27.56 |
| 18* | −26.911 | 0.15 | | | 28.33 |
| 19* | −160.623 | 6.00 | 1.43875 | 95.0 | 30.48 |
| 20 | −24.626 | 0.15 | | | 31.32 |
| 21 | −273.831 | 7.25 | 1.73000 | 26.0 | 36.05 |
| 22 | −30.409 | | | | 37.09 |

Aspheric Coefficients

| R18 | K = 0.00000e+000 | A4 = 1.29928e−005 |
| | A6 = 9.54236e−009 | A8 = −1.36553e−010 |
| | A10 = 3.48384e−013 | |
| R19 | K = 0.00000e+000 | A4 = 3.56049e−007 |
| | A6 = −3.33936e−008 | A8 = 7.24902e−011 |
| | A10 = −3.40933e−014 | |

NUMERICAL EXAMPLE 2 f = 18.55-21.89-28.72 Fno = 1.85-2.12-2.58
2ω = 66.6°-58.2°-46.0°

| Surface No. | r | d | nd | vd | Effective diameter |
|---|---|---|---|---|---|
| 1 | 37.047 | 2.20 | 1.69680 | 55.5 | 43.95 |
| 2 | 22.951 | 6.56 | | | 37.46 |
| 3 | 47.989 | 1.75 | 1.69680 | 55.5 | 37.04 |
| 4 | 28.366 | 7.26 | | | 34.18 |
| 5 | −260.952 | 1.80 | 1.65844 | 50.9 | 33.88 |
| 6 | 81.830 | 2.32 | | | 33.35 |
| 7* | 1364.532 | 3.60 | 1.52996 | 55.8 | 33.44 |
| 8* | 487.850 | Variable | | | 33.24 |
| 9 | 427.062 | 5.95 | 1.54814 | 45.8 | 30.62 |
| 10 | −42.601 | 0.00 | | | 30.39 |
| 11 | ∞ | 0.16 | | | 28.71 |
| 12 | 75.136 | 3.37 | 1.67270 | 32.1 | 27.84 |
| 13 | −424.140 | 2.21 | | | 26.89 |
| 14 | −55.409 | 2.20 | 1.65844 | 50.9 | 26.05 |
| 15 | −195.296 | Variable | | | 25.25 |
| 16 | ∞ | 0.44 | | | 22.87 |
| 17 | 91.299 | 2.57 | 1.56384 | 60.7 | 22.80 |
| 18 | −70.556 | Variable | | | 22.67 |
| 19 | 37.311 | 1.00 | 1.72342 | 38.0 | 21.14 |
| 20 | 23.865 | Variable | | | 20.30 |
| 21 | −21.157 | 1.35 | 1.84666 | 23.8 | 19.70 |
| 22 | 118.635 | 8.16 | 1.49700 | 81.5 | 21.33 |
| 23 | −24.420 | 0.15 | | | 24.76 |
| 24 | 173.326 | 7.00 | 1.49700 | 81.5 | 28.19 |
| 25 | −33.892 | Variable | | | 29.61 |
| 26 | 69.897 | 5.50 | 1.77071 | 23.0 | 34.51 |
| 27 | −66.419 | 1.50 | | | 34.42 |
| 28 | −67.804 | 1.50 | 1.84666 | 23.8 | 33.36 |
| 29 | −358.601 | 5.93 | | | 33.11 |
| 30 | ∞ | 30.30 | 1.51633 | 64.1 | 31.69 |
| 31 | ∞ | 0.00 | | | 27.21 |
| 32 | ∞ | 21.00 | 1.69680 | 55.5 | 27.21 |
| 33 | ∞ | | | | 24.45 |

Aspheric Coefficients

| R7 | K = 4.92437e+003 | A4 = 1.99380e−005 |
| | A6 = −4.45209e−008 | A8 = 9.43125e−011 |
| | A10 = −1.77451e−013 | |
| R8 | K = 0.00000e+000 | A4 = 1.21880e−005 |
| | A6 = −3.59094e−008 | A8 = 3.91580e−011 |
| | A10 = −6.24508e−014 | A12 = −7.73723e−017 |

Variable Length Data

| | Focal Length | | |
|---|---|---|---|
| | 18.55 | 21.89 | 28.72 |
| d8 | 31.21 | 23.36 | 13.36 |
| d15 | 34.72 | 29.47 | 21.06 |
| d18 | 1.32 | 6.49 | 18.24 |
| d20 | 8.22 | 10.63 | 8.66 |
| d25 | 0.98 | 6.50 | 15.13 |

NUMERICAL EXAMPLE 3 f = 48.85-62.70-77.00 Fno = 2.50-2.85-3.20
2ω = 55.86°-44.88°-37.18°

| Surface No. | r | d | nd | vd | Effective diameter |
|---|---|---|---|---|---|
| 1 | 145.968 | 9.40 | 1.80440 | 39.6 | 81.35 |
| 2 | −1917.291 | 0.25 | | | 78.66 |
| 3 | 66.996 | 4.00 | 1.48749 | 70.2 | 61.78 |
| 4 | 33.183 | 15.04 | | | 49.38 |
| 5 | −101.584 | 2.50 | 1.48749 | 70.2 | 47.68 |
| 6 | 36.013 | 6.32 | | | 40.60 |
| 7 | 50.072 | 4.50 | 1.60562 | 43.7 | 39.45 |
| 8 | 129.707 | Variable | | | 38.52 |
| 9* | 83.077 | 4.40 | 1.64000 | 60.1 | 29.73 |
| 10 | −128.042 | 7.00 | | | 29.69 |
| stop 11 | ∞ | Variable | | | 28.32 |
| 12 | −253.928 | 7.30 | 1.77250 | 49.6 | 26.71 |
| 13 | −34.913 | 2.20 | 1.74077 | 27.8 | 26.54 |
| 14 | −104.388 | Variable | | | 27.52 |
| 15 | 94.955 | 5.45 | 1.83400 | 37.2 | 28.77 |
| 16 | −138.906 | 1.69 | | | 29.12 |
| 17* | −64.950 | 1.80 | 1.62004 | 36.3 | 29.12 |
| 18 | 53.965 | Variable | | | 30.10 |
| 19 | −57.656 | 3.00 | 1.84666 | 23.8 | 34.60 |
| 20 | 102.653 | 11.30 | 1.48749 | 70.2 | 39.74 |
| 21 | −62.527 | 0.25 | | | 45.01 |
| 22 | −2569.051 | 6.10 | 1.78800 | 47.4 | 49.98 |
| 23 | −97.611 | 0.25 | | | 51.60 |
| 24 | 99.183 | 10.40 | 1.77071 | 23.0 | 56.50 |
| 25 | −212.253 | 5.00 | | | 56.78 |
| 26 | ∞ | 46.25 | 1.51633 | 64.1 | 56.11 |
| 27 | ∞ | | | | 53.18 |

-continued f = 48.85-62.70-77.00 Fno = 2.50-2.85-3.20
2ω = 55.86°-44.88°-37.18°

Aspheric Coefficients

R9  K = −6.03718e−001  A4 = 2.23798e−007  A6 = −1.13330e−009
    A8 = 3.04999e−012
R17 K = 1.93656e−003   A4 = 1.30289e−007  A6 = −1.61419e−009
    A8 = 5.48305e−012

Variable Length Data

| | Focal Length | | |
|---|---|---|---|
| | 48.85 | 62.70 | 77.00 |
| d8 | 38.51 | 21.05 | 7.80 |
| d11 | 9.62 | 12.27 | 12.56 |
| d14 | 0.76 | 7.11 | 18.60 |
| d18 | 10.90 | 19.35 | 20.83 |

TABLE 1

| | | Numerical Example | | |
|---|---|---|---|---|
| Condition | | 1 | 2 | 3 |
| (A1) | (1) | 0.804 | — | — |
| (A2) | (2) | 26 | — | — |
| (A3) | (3) | 1.73000 | — | — |
| (A4) | (4) | 1 | — | — |
| (A5) | (5) | 1.85 | — | — |
| (A6) | (6) | 13.73 | — | — |
| (A7) | (7) | 94.99 | — | — |
| (A1) | (8) | — | 0.802 | 0.825 |
| (A2) | (9) | — | 23 | 23 |
| (A3) | (10) | — | 1.77071 | 1.77071 |
| (A4) | (11) | — | 0.92 | 1 |
| (A5) | (12) | — | 1.95 | 1.45 |
| (A6) | (13) | — | 21.75 | 27.94 |
| (A7) | (14) | — | 81.54 | 70.23 |

An exemplary embodiment of an image pickup apparatus (a camera system or an optical apparatus) that uses, as a shooting optical system, an optical system according to each exemplary embodiment of the present invention is described below with reference to FIG. 7.

FIG. 7 illustrates exemplary main components of a single-lens reflex camera (image pickup apparatus) according to each exemplary embodiment of the present invention. Referring to FIG. 7, a shooting lens 10 includes an optical system 1 according to the first through the third exemplary embodiments. The optical system 1 is supported by a lens barrel 2, which is a supporting member. The single-lens reflex camera includes a camera body 20.

The camera body 20 includes a quick return mirror 3, a focusing screen 4, a pentagonal roof prism 5, and an eyepiece lens 6. The quick-return mirror 3 reflects a light flux from the shooting lens 10 in an upward direction. The focusing screen 4 is located at an image forming position of the shooting lens 10.

The pentagonal roof prism 5 converts an inverse image formed on the focusing screen 4 into an erect image. An observer (operator of the camera) can observe the erect image via the eyepiece lens 6.

During shooting, the quick return mirror 3 retracts from the optical path. Then, an image is formed by the shooting lens 10 on a photosensitive surface 7. The photosensitive surface 7 includes a solid-state image sensor (photoelectric conversion element), such as a CCD sensor or CMOS sensor, or a silver-halide film.

Now, an exemplary embodiment of a projection apparatus (a projector) that uses, as a projection optical system, an optical system according to each exemplary embodiment of the present invention is described below with reference to FIG. 8.

In the example illustrated in FIG. 8, the optical system of the present invention is applied to a three-plate type color LCD projector (a projection apparatus). In addition, in the example illustrated in FIG. 8, the projection apparatus is configured to combine image information including a plurality of color light fluxes based on a plurality of LCD display devices by using a color combination unit. Furthermore, the projection apparatus magnifies and projects the combined information on a screen surface by using the projection lens.

Referring to FIG. 8, a color LCD projector 100 includes three panels 5R, 5G, and 5B configured to reflect light fluxes of respective three colors of R, G, and B and a prism 200, which is a color combining unit configured to combine RGB color light fluxes from the panels 5R, 5G, and 5B.

The prism 200 combines the light fluxes into one optical path. In addition, the color LCD projector 100 projects the combined light onto a screen 400 by using a projection lens 300, which corresponds to the above-described optical system.

By applying the optical system according to each of the numerical examples 1 through 3 to a digital camera or a projector, an image pickup apparatus or a projection apparatus (optical apparatus) having a high optical performance can be implemented.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-217842 filed Aug. 27, 2008, which is hereby incorporated by reference herein in its entirety.

What is claimed is:

1. An optical system comprising, in order from an enlargement conjugate side to a reduction conjugate side:

a first lens unit having a negative refractive power; and
a second lens unit having a positive refractive power,
wherein an aperture stop is located closer to the reduction conjugate side than the first lens unit,
wherein one or more positive lenses are located closer to the reduction conjugate side than the aperture stop,
wherein the one or more positive lenses include a P-th positive lens located closest to the reduction conjugate side, and
wherein a relative partial dispersion of a material of the P-th positive lens ($\theta_{gFP}$), an Abbe number of the material of the P-th positive lens ($\nu_{dp}$), a refractive index, with respect to d-line light, of the material of the P-th positive lens ($n_{dp}$), a distance from the aperture stop to a surface of the P-th positive lens on the reduction conjugate side ($d_{SP-P}$) a distance from the aperture stop to a surface on the reduction conjugate side of a lens located closest to the reduction conjugate side ($d_{SP-PR}$), a focal length of the P-th positive lens ($f_P$), and a focal length of the entire optical system ($f_S$) satisfy the following conditions:

$$0.79 < \theta_{gFP} - (1.00 \times 10^{-4} \times \nu_{dp}^2 - 9.10 \times 10^{-3} \times \nu_{dp}) < 0.86$$

$$10 < \nu_{dp} < 30$$

$$1.7 < n_{dp} < 2.2$$

$$0.7 < d_{SP-P}/d_{SP-PR} \leq 1.0$$

$$0.5 < f_P/f_S < 2.2.$$

2. The optical system according to claim 1, wherein an Abbe number, with respect to d-line light, of a material of at least one negative lens, among negative lenses located closer to the reduction conjugate side than the aperture stop ($v_{NN}$) and a focal length, with respect to d-line light, of the at least one negative lens ($f_{NN}$) satisfy the following condition:

$$0 < |(v_{NN} \times f_{NN})/f_S| < 30.$$

3. The optical system according to claim 1, wherein a maximum value of values of Abbe numbers, with respect to d-line light, of materials of positive lenses other than the P-th positive lens, among the one or more positive lenses located closer to the reduction conjugate side than the aperture stop ($v_{PPmax}$) satisfies the following condition:

$$65 < v_{PPmax} < 98.$$

4. An optical apparatus comprising the optical system according to claim 1.

* * * * *